2,950,962
REDUCTION OF FLUORIDE TO METAL

Oscar Norman Carlson, Frederick A. Schmidt, and Frank H. Spedding, Ames, Iowa, assignors to the United States of America as represented by the United States Atomic Energy Commission No Drawing. Filed Mar. 28, 1957, Ser. No. 649,265

6 Claims. (Cl. 75—84.4)

This invention deals with the production of yttrium metal from yttrium trifluoride.

Yttrium metal is used as a getter in the manufacture of vacuum tubes on account of its great affinity to hydrogen. In manufacturing vacuum tubes with yttrium as a getter, the oxygen is first swept out of the tube with hydrogen gas, the yttrium metal is placed in the tube, and the tube is then evacuated. The yttrium reacts with any remaining hydrogen and forms yttrium hydride thereby removing the hydrogen from the atmosphere. Another application of yttrium metal is for the preparation of yttrium hydride which is used as a neutron moderator, instead of paraffin, to slow down the fast neutrons of a neutron source, yttrium hydride having a higher hydrogen concentration than paraffin. A neutron source of the type intended for the use of yttrium hydride as a substitute for paraffin as a moderator is disclosed, for instance, in "Miscellaneous Physical and Chemical Techniques of the Los Alamos Project," by Graves and Froman, National Nuclear Energy Series V-3, p. 107. For this use it is desirable to have the yttrium in a high degree of purity and especially free from contaminants that have a high neutron-capture cross section.

Reduction of yttrium trifluoride with calcium metal in a refractory-lined sealed crucible heated to 1050° C. yielded metallic yttrium, but the yttrium did not coalesce and separate from the calcium fluoride slag formed. In order to obtain massive metal with good slag separation it was found necessary to reach temperatures of 1500° C.

It is an object of this invention to provide a process of making yttrium metal from the fluoride which can be carried out at comparatively low temperatures and thus in relatively low-melting equipment.

It is also an object of this invention to provide a process of making yttrium metal from the fluoride in which attack of the equipment by a reaction with the reactants is reduced to a minimum due to the lower temperature at which the reaction can be carried out, so that the metal produced is less contaminated and the equipment has a longer service life.

It is another object of this invention to provide a process of producing yttrium metal from the fluoride in which the metal coalesces readily and is obtained in the form of one massive piece.

It is finally also an object of this invention to provide a process of producing yttrium metal from the fluoride in which an improved yield of metal is obtained.

It has been found that when a mixture of calcium and magnesium metals is used in the reduction of the yttrium fluoride, a lower-melting mass is obtained due to the formation of an yttrium-magnesium alloy and also that, instead of at 1500° C., the process can be carried out at about 1000° C.; by this, less contamination of the yttrium by the crucible material occurs, which in turn results in less attack and a longer service life of the crucible. It was also found that by adding calcium chloride to the reaction mixture, the melting point and the viscosity of the slag formed in the reaction are lowered so that the yttrium-magnesium alloy can coalesce more readily and a more quantitative yield is obtained. Furthermore, it was found that only when certain critical operating conditions are observed, which will be set forth later, is a satisfactory operation obtained.

The process of this invention comprises mixing yttrium trifluoride with a calcium-magnesium mixture, the amount of the calcium being between 10 and 20 percent in excess of that stoichiometrically required and the amount of the magnesium being adjusted so that the yttrium alloy produced contains from about 12 to 25 percent of magnesium, adding anhydrous calcium chloride in an amount to obtain a slag containing from 30 to 60 percent by weight of calcium chloride; heating the reaction mixture thus obtained to from 900 to 1100° C. in an inert atmosphere whereby an yttrium-magnesium-calcium alloy forms and separates from a calcium chloride-calcium fluoride slag; removing the slag from the alloy; and heating the alloy in vacuo at about 1100° C. whereby magnesium and calcium volatilize and metallic yttrium sponge is obtained.

The yttrium trifluoride should be of high purity, finely divided, and free of residual oxide or oxyfluoride. The calcium metal for the reduction of yttrium fluoride, too, is advantageously of high purity and preferably in granular form. An excess should be added, as has been mentioned before, partly because a more complete reduction is then obtained and secondly because part of the calcium is taken up by the yttrium together with magnesium to form an yttrium-magnesium-calcium alloy. The calcium excess may range between 10 and 20 percent of the stoichiometric amount, but an excess of 20 percent is preferred because alloys containing a higher calcium content were found to spatter less readily during the heating step for volatilization of the magnesium and the calcium.

The quantity of the magnesium should be adjusted so that the alloy contains preferably between 15 and 20 percent of magnesium. Also here the higher content is desirable, because then the melting point is lowest (the alloy containing 15 percent of magnesium melts at 1025° C., that containing 17 percent of magnesium at 925° C., and the one containing 20 percent at 850° C.). However, if the slag and the alloy are to be separated by pouring the liquid slag off the solidified alloy, then an alloy containing 17 percent of magnesium is preferred, because a greater difference then exists between the freezing points of slag and alloy. The magnesium is also advantageously used in disintegrated form, turnings being suitable.

Calcium chloride should be present in a quantity to obtain a calcium fluoride-calcium chloride slag containing from 30 to 60 percent of calcium chloride. The calcium chloride should be dried in vacuo at about 550° C. prior to use. The calcium chloride functions as a flux for the slag, and it also decreases its density whereby phase separation is improved and the slag made to float on the alloy and thus to protect it.

The reaction is carried out under substantially atmospheric pressure; a crucible provided with a lid is suitable. If the yttrium is to be converted to the hydride and the latter is to be used as a moderator, the crucible is advantageously made of a material which has a low neutron-capture cross section. Zirconium, niobium, and titanium are materials which have this property and which also are resistant to the high reduction temperatures.

The reactants are thoroughly mixed and then packed in the container. A reaction mixture composed of 2600 g. $YF_3$, 2090 g. $CaCl_2$, 1285 g. calcium, and 395 g. magnesium, using the conditions just described, gave a yield of between 98 and 99 percent.

The above experiments were carried out at a temperature between 950 and 1050° C. the time at temperature being approximately one-half hour. Heating was carried out in a conventional gas furnace which had been brought to reaction, or slightly higher, temperature. Heat has to be added during the entire reaction period because the reduction is not very exothermic. The reduction was carried out at substantially atmospheric pressure in an inert atmosphere; argon or helium were found to be the preferred gases for this purpose. During the reduction a pressure usually built up due to the expansion of the argon or helium gas and the release of volatile ingredients from the charge. This pressure was relieved by a pressure release valve arranged in the lid of the crucible.

After the reaction the retort containing the molten products was removed from the furnace and was tilted approximately 15° from horizontal, thus allowing the immiscible slag and alloy to solidify in shallow layers along the side wall of the crucible. This facilitates removal of the slag and alloy from the metal crucible.

The alloy and the slag can also be separated by solidifying the alloy only while keeping the slag in the liquid state and then pouring the slag off the alloy. (In this case the amount of magnesium added has been preferably chosen so that a content of 17% is obtained in the alloy as has been mentioned above.) Solidification of the alloy only is obtained by cooling to about 900° C. After the liquid slag has been poured off, the crucible is returned to the furnace and heated to 1025° C. thus remelting the alloy; it then can be poured from the crucible. This method has the disadvantage that a higher contamination of the yttrium results from the reaction with the crucible material due to the two heating steps.

The analysis of a typical alloy obtained by reacting a mixture according to this invention in a zirconium crucible showed the following contents: magnesium 19 percent by weight, calcium between 7 and 8 percent, zirconium 0.2 to 1.2 percent, iron 0.015 percent, nitrogen 0.020 percent, and carbon 0.030 percent.

The alloys were brittle and could be crushed easily. For the vaporization of calcium and magnesium, about ½-inch pieces were preferred. These pieces were packed in a crucible made of the same materials as those usable for the reduction step, and the crucible was inserted in a graphite heater; the assembly of the crucible and heater was placed into a quartz tube. The quartz tube with content was then evacuated to a pressure of about 1 micron or less and heated in an induction furnace. After a temperature of about 800° C. was obtained, heating was continued, though at a slower rate, until 1100° C. was reached. This step of heating from 800 to 100° C. was usually carried out in about three hours. At this temperature of 1100° C. the alloy did not melt, but the magnesium, calcium and other volatile components were driven off. An average weight loss of about 27 percent was obtained in this step. The yttrium after this vaporization step contained from 0.3 to 1.5 percent of zirconium, 0.02 percent of magnesium, 0.02 percent of calcium, 0.014 percent of iron, 0.01 percent of nitrogen and 0.030 percent of carbon; the yttrium at this stage is porous in nature and is thus referred to as sponge.

The yttrium sponge obtained after volatilization of calcium and magnesium can be used as is as a getter in the manufacture of vacuum tubes. The large surface area of the spongy material is particularly advantageous for this purpose.

If the yttrium is to be used, in the form of hydride, as a neutron moderator, the yttrium sponge is advantageously remelted; this is preferably done in a consumable arc furnace under a helium atmosphere or vacuum whereby a massive ingot is obtained. The ingot is then hydrided by heating to about 800° C. and reacting at this temperature with a hydrogen atmosphere which preferably is at slightly superatmospheric pressure.

It will be understood that this invention is not to be limited to the details given herein but that it may be modified within the scope of the appended claims.

What is claimed is:

1. A process of producing yttrium metal by reacting yttrium fluoride with calcium to form an yttrium alloy and a calcium fluoride-containing slag, comprising mixing yttrium fluoride with calcium and magnesium metals, the amount of the calcium being between 10 and 20 percent in excess of that stoichiometrically required and the amount of the magnesium being adjusted so that the yttrium alloy produced contains from about 12 to 25 percent of magnesium; adding anhydrous calcium chloride in an amount to obtain a slag containing from 30 to 60 percent by weight of calcium chloride; heating the reaction mixture thus obtained to from 900 to 1100° C. in an inert atmosphere whereby an yttrium-calcium-magnesium alloy forms and separates from a calcium chloride-calcium fluoride slag; separating the alloy from the slag; and heating the alloy in vacuum at about 1100° C. whereby magnesium and calcium are volatilized and metallic yttrium is obtained.

2. The process of claim 1 wherein the calcium excess is 20 percent and magnesium is present in a quantity to obtain an alloy containing 17 percent of magnesium.

3. The process of claim 1 wherein the inert atmosphere is helium.

4. The process of claim 1 wherein the inert atmosphere is argon.

5. The process of claim 1 wherein the metallic yttrium is arc-melted in an inert atmosphere so that its density is increased.

6. The process of claim 1 wherein the temperature within the range of from 900 to 1100° C. is chosen so that the yttrium-calcium-magnesium alloy is melted.

References Cited in the file of this patent

UNITED STATES PATENTS

| | | |
|---|---|---|
| 1,659,209 | Marden | Feb. 14, 1928 |
| 1,738,669 | Rich | Dec. 10, 1929 |
| 2,771,329 | Morana | Nov. 20, 1956 |

FOREIGN PATENTS

| | | |
|---|---|---|
| 686,845 | Great Britain | Feb. 4, 1953 |
| 518,554 | Canada | Nov. 15, 1955 |

OTHER REFERENCES

Hampel: Rare Metals Handbook, Reinhold Publishing Corp., New York, pages 14, 329, 333–337 (1954).